A. LANZDORF.
CLUTCH.
APPLICATION FILED APR. 6, 1914.
1,157,789. Patented Oct. 26, 1915.
2 SHEETS—SHEET 1.
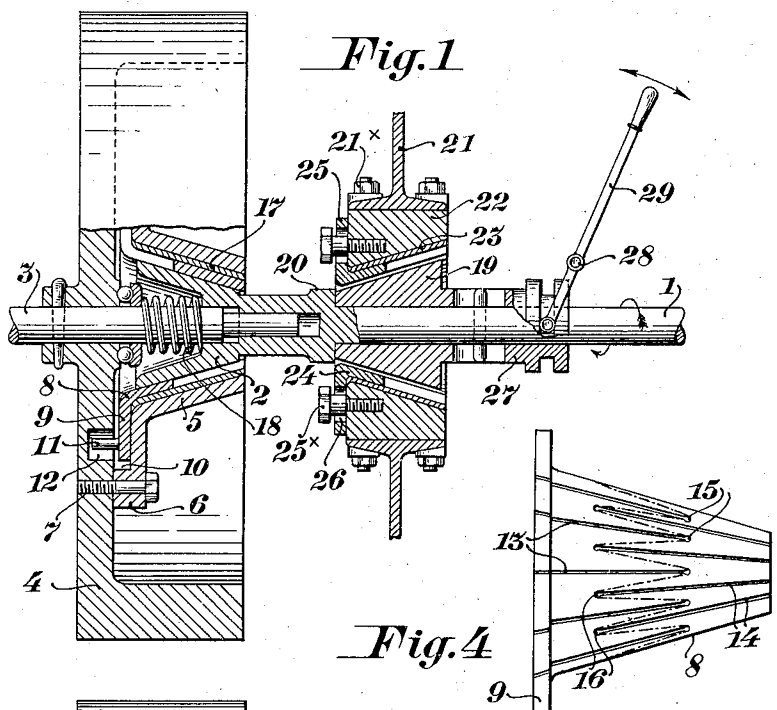
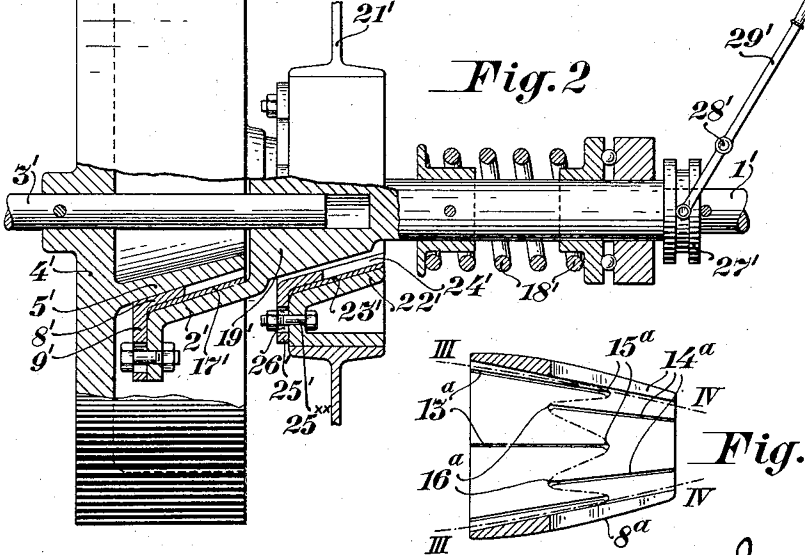
Witnesses:
H. A. Lefling
Bert B. Newcomb
Inventor:
Adolf Lanzdorf
by J. B. Singer Atty A. LANZDORF.
CLUTCH.
APPLICATION FILED APR. 6, 1914.
1,157,789. Patented Oct. 26, 1915.
2 SHEETS—SHEET 2.
Fig. 3
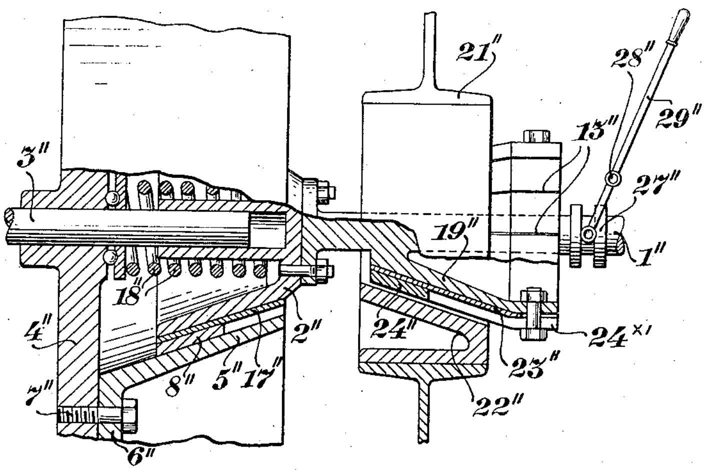
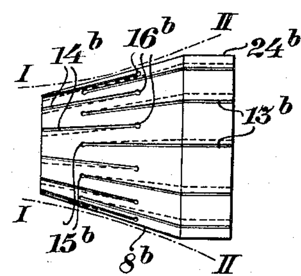
Fig. 6
Witnesses:
W. A. Hefling
Benj. B. Newcomb.
Inventor:
Adolf Lanzdorf
by B. Singer
Atty.

UNITED STATES PATENT OFFICE.

ADOLF LANZDORF, OF VIENNA, AUSTRIA-HUNGARY.

CLUTCH.

1,157,789. Specification of Letters Patent. Patented Oct. 26, 1915.

Application filed April 6, 1914. Serial No. 829,975.

*To all whom it may concern:*

Be it known that I, ADOLF LANZDORF, residing at Vienna, XVIII, in Austria-Hungary, have invented certain new and useful Improvements in Clutches, of which the following is a specification.

This invention relates to clutches, particularly for automobile purposes, of the type wherein a coupling sleeve is arranged between two conical clutch members, and the invention consists in using, in a clutch of this type, a sleeve having series of slits overlapping each other, as will be described hereinafter, so that the sleeve is elastic and that when the clutch is thrown into engagement the sleeve can expand and the friction gradually increases, in a manner precluding excessive fierceness of grip.

The invention is illustrated in the accompanying drawings, in which Figures 1, 2 and 3 are longitudinal sections showing three forms of construction; Fig. 4 is an elevation, to a larger scale, showing the sleeve used in the construction shown in Fig. 1; Figs. 5 and 6 show modified forms of the sleeve Fig. 4.

Referring in the first instance to Fig. 1, 1 designates a shaft, which is connected to a driving shaft, not shown, in such manner that the shaft 1 is rotated by the driving shaft, but is axially movable. To one end of the shaft 1 is fixed a hollow cone 2, embracing the end of the shaft 3 to be driven, which is loose therein. The shaft 3 has fixed to it a fly-wheel 4 of drum shape, toward which the base of the cone is directed. The cone 2 is surrounded by a hollow cone 5, concentric therewith, having a flange 6 fixed by bolts 7 to the pulley 4. Between the cones 2 and 5 there is a coupling sleeve 8; shown separately in Fig. 4, this part 8 being also of conical shape and having a flange 9 at its base. The said flange 9 enters the annular space 10 between the flange 6 and the fly-wheel, and dogs 11 project from the flange 9 into radial grooves 12 formed in the web of the fly-wheel, so that the sleeve 8 cannot rotate in relation to the fly-wheel, but that the two parts are engaged to rotate together. The sleeve 8 has two series of straight slits 13 and 14. These two series overlap each other, that is to say, the slits forming each series extend some distance between the slits forming the other series. The slits 13 extend to one end of the sleeve, and the slits 14 to the other. On the sleeve the slits terminate in holes 15 and 16 respectively. By reason of these slits the sleeve has elasticity which allows of expansion along a line partly represented by the dot and dash line in Fig. 4, the said line extending all around the sleeve. The cone 5 has a lining of asbestos, textile fabric or other elastic material, the purpose of which is to limit the expansion allowed by the elasticity imparted to the sleeve 8. A helical spring 18 surrounding the shaft 3 presses the cone 2 into the sleeve 8, thus establishing or increasing the friction between them. The shaft 1 is embraced by a truncated cone 19 having a limited sliding movement thereon, but engaged to rotate with the shaft. The cone 19 tapers in the opposite direction to the cone 2. A collar 20 on the shaft 1 is thrust by the spring 18 against the smaller face of the cone 19. The latter is surrounded by an internally coned ring 22, which is fixed to the frame work 21 by screws 21ˣ, the said ring having a lining 23 of asbestos or the like. Between this lining and the cone 19 there is a coupling sleeve 24 similar in construction to the sleeve 8. The flange 25 of the sleeve 24 is connected to the ring 22 by bolts 25ˣ which pass loosely through radial slots 26 in the flange, so that the two parts rotate together. The cone 19 has an extension or boss on the shaft 1, grooved for engagement with a clutch lever 29 pivoted at 28, whereby the cone 19 can be shifted on the shaft 1.

The action of the clutch is as follows:— Movement of the cone 19 to the right, by the lever 29, enables the spring 18 to move the cone 2 in the same direction. In the course of this movement the cone 2 gradually expands the slit cone sleeve 8, so as to produce gradually increasing friction between the sleeve and the cone 5. By this means a smooth, elastic but firm clutch action is obtained, between the driving and driven shafts. Another advantage of the arrangement is that the spring 18 can be comparatively weak, and the coupling members comparatively small, quick and reliable clutch action being nevertheless maintained. The braking and stopping of the driving shaft is effected in an analogous manner, the cone 19 being moved to the left by the lever 29, and caused to gradually expand the slit sleeve 24, so as to produce gradually increasing friction between the same and the cone 19, whereby the shaft 1 is braked. Simultaneously with this brake action the coupling between the driving and driven shafts is gradually interrupted, the cone 2 being moved to the left and causing the friction between it and the sleeve 8 to gradually decrease and ultimately become nil when the movement of the cone 19 and its friction with the sleeve 24 have stopped the shaft 1. This counter clutch action not only simplifies the control, but gives increased security, because in disengaging the clutch while driving, an automatically graduated brake action is simultaneously obtained, and when the vehicle stops the driving shaft is braked.

In Fig. 2, $1^1$ designates the driving shaft, $2^1$ the cone integral with the end of same, $3^1$ the driven shaft, $4^1$ the fly-wheel, $5^1$ the cone surrounded by the cone $2^1$, $8^1$ the slit coupling sleeve, $9^1$ the flange thereof, and $17^1$ the lining of the cone $2^1$. The cone $5^1$ is integral with the pulley $4^1$, and lies within the sleeve $8^1$. The cone $2^1$ surrounding the sleeve is integral with a cone 19 formed on the end of the shaft $1^1$, and the latter can be axially moved by means of a clutch lever $29^1$ pivoted at $28^1$, and engaging the shaft between collars $27^1$. The cone $19^1$ is surrounded by an internally coned ring $22^1$ having a lining $23^1$ and fixed to the frame $21^1$, and between the ring and cone there is a slit sleeve $24^1$, having a flange $25^1$ with slots $26^1$, through which pass bolts $25^{xx}$ engaging the sleeve with the ring. A spring $18^1$ coiled around the shaft $1^1$ thrusts the cone $2^1$ against the sleeve $8^1$, and the cone $19^1$ out of the sleeve $24^1$.

In Fig. 3, $1^{11}$ designates the driving shaft, $2^{11}$ the cone fixed to same at the end, $3^{11}$ the driven shaft, $4^{11}$ the fly-wheel, and $5^{11}$ the cone surrounding the cone $2^{11}$ and having a flange $6^{11}$ fixed by bolts $7^{11}$ to the fly-wheel; $8^{11}$ is the slit sleeve into which the cone $2^{11}$, having an elastic cover $17^{11}$, is thrust by a spring $18^{11}$. A cone $19^{11}$ formed on the shaft $1^{11}$ and having an elastic cover $23^{11}$ is engaged by bolts with a slit sleeve $24^{11}$ lying with an internally coned ring $22^{11}$ fixed to a frame part $21^{11}$. The sleeve $24^{11}$ is in part conical, to conform to the coincity of the ring and cone $19^{11}$, but has a short cylindrical extension $24^{x1}$ across which the slits $13^{11}$ extend. The shaft $1^{11}$ is engaged at $27^{11}$ with a clutch lever $29^{11}$ pivoted at $28^{11}$, whereby the cones $2^{11}$ and $19^{11}$ can be moved out of, and into, the cones $5^{11}$ and the ring $22^{11}$ respectively. It will be seen that neither of the slit sleeves has a flange in this case.

Fig. 5 shows a slit sleeve adapted to be used with the clutch (Fig. 2) designated $8^a$, suitable either for the driving clutch or the braking of the driving shaft, with slits $13^a$, $14^a$, terminating in holes $15^a$, $16^a$ respectively, arranged in the manner already described. The wall of the sleeve assumes in the course of coupling a curvature, as indicated by the broken lines III—IV.

Fig. 6 shows a sleeve adapted to be used in connection with the clutch (Fig. 3) designated $8^b$, also suitable for the driving clutch and brake, with slits $13^b$, $14^b$ and holes $15^b$, $16^b$. This sleeve has a cylindrical extension $24^b$, and curves as indicated by the dotted lines within said figure.

What I claim as my invention and desire to secure by Letters Patent of the United States is:—

1. In a cone clutch the combination of a conical male clutch member, a conical female clutch member, and a conical sleeve intermediate of said male and female members, said sleeve having two series of substantially parallel slits the slits of each series extending from opposite ends of the sleeve, and the two series overlapping each other on the sleeve.

2. In a cone clutch the combination of a conical male clutch member, a conical female clutch member, and a means intermediate of said male and female members for frictionally coupling both clutch members and having two series of substantially parallel slits, segments formed by said slits, each series of said slits extending from opposite ends of said means, and both series overlapping each other, said segments being adapted to be pressed into said female member, substantially as described.

In witness whereof I have signed this specification in the presence of two witnesses.

ADOLF LANZDORF.

Witnesses:
KARL HEISLER,
AUGUST FUGGER.